United States Patent
Arora et al.

(10) Patent No.: US 10,861,276 B1
(45) Date of Patent: *Dec. 8, 2020

(54) METHOD AND SYSTEM OF PERSONAL VENDING

(71) Applicant: Cantaloupe Systems, Inc, San FRancisco, CA (US)

(72) Inventors: Mandeep Arora, San Francisco, CA (US); Anant Agrawal, San Francisco, CA (US); Iryna Bandura, Kyiv (UA); Oleksa Chvala, Kyiv (UA); Allen Aung Kyaw Lwin, San Francisco, CA (US); Boris Glants, Mt. View, CA (US); Justin Grant, Berkeley, CA (US)

(73) Assignee: USA TECHNOLOGIES, INC., Malvern, PA (US)

(*) Notice: Subject to any disclaimer, the term of this patent is extended or adjusted under 35 U.S.C. 154(b) by 254 days.

This patent is subject to a terminal disclaimer.

(21) Appl. No.: 15/875,725

(22) Filed: Jan. 19, 2018

Related U.S. Application Data

(63) Continuation of application No. 13/857,129, filed on Apr. 4, 2013, now Pat. No. 9,898,884.

(51) Int. Cl.
  *G07F 9/00* (2006.01)
  *G06Q 30/02* (2012.01)

(52) U.S. Cl.
  CPC ......... *G07F 9/002* (2020.05); *G06Q 30/0226* (2013.01)

(58) Field of Classification Search
  CPC .............................. G07F 9/002; G06Q 30/0226
  USPC .................................................. 700/231–244
  See application file for complete search history.

(56) References Cited

U.S. PATENT DOCUMENTS

| | | | |
|---|---|---|---|
| 8,191,779 B2* | 6/2012 | Illingworth | G06Q 30/02 235/381 |
| 8,781,622 B2 | 7/2014 | Mockus et al. | |
| 8,856,045 B1 | 10/2014 | Patel et al. | |
| 9,240,007 B2 | 1/2016 | Barragán Treviño et al. | |
| 9,898,884 B1* | 2/2018 | Arora | G07F 11/002 |
| 2002/0161476 A1* | 10/2002 | Panofsky | G07F 17/0014 700/231 |
| 2002/0165787 A1 | 11/2002 | Bates et al. | |

(Continued)

OTHER PUBLICATIONS

Final Office Action for U.S. Appl. No. 15/875,694, dated Jan. 29, 2020, 7 pages.

(Continued)

*Primary Examiner* — Michael Collins
(74) *Attorney, Agent, or Firm* — RatnerPrestia

(57) ABSTRACT

Systems for vending products to a customer that encompasses a group of co-located vending machines managed by a vending company, a database of current inventory of products in the vending machines and customer purchase history; and the use of a personal electronic device by the customer. Embodiments include a single order by a customer from a sorted list of prior purchases, and where a single purchase comprises sub-products from multiple co-located vending machines. Embodiments include the customer selecting either products or vending machines from a list of options provided via the user interface of the personal electronic device, wherein the list of options depends on the actual available inventory in vending machines co-located with the customer, and the customer purchase history.

4 Claims, 7 Drawing Sheets

(56) References Cited

U.S. PATENT DOCUMENTS

2005/0222933 A1* 10/2005 Wesby .................. G06Q 40/00
                                                                 705/36 R
2012/0150683 A1    6/2012 Herrington
2013/0054385 A1* 2/2013 Holman ................. G07F 9/023
                                                                   705/15

OTHER PUBLICATIONS

Non Final Office Action for U.S. Appl. No. 15/875,694, dated Oct. 23, 2019, 9 pages.

* cited by examiner

Fig. 4
Database Tables

| | A | B | C | D | E | F | G | H |
|---|---|---|---|---|---|---|---|---|
| 10 | Customer ID | Customer Name | Customer Address | | | | | |
| 11 | 4567 | Suzie | 203.0.113.1 | | | | | |
| 12 | | | | | | | | |
| 13 | Product SKU | Product Name | Purchase Date | Purchase Time | Total Purchases | How Paid | Machine ID | Other Information |
| 14 | 1234-45 | Cola | 1/1/92 | 11:31 PM | 9 | Coins | 491 | |
| 15 | 9900-31 | Sugar-O's | 7/13/13 | 4:13 PM | 119 | Coins | 4431 | |
| 16 | 3345-AA | Magic Almonds | 7/12/13 | 3:58 PM | 431 | Bills | 4431 | |
| 17 | 4450-00 | Mo' Fat | 7/1/13 | 10:01 AM | 2 | NFC | 4431 | |
| 18 | | | | | | | | |
| 19 | Machine ID | Machine Location | Machine Route | Machine Address | Icon Code | | | Other Information |
| 20 | 4431 | 600 Howard St. | 66 | 198.51.100.1 | 88 | | | <? xml ver ... |
| 21 | | | | | | | | |
| 22 | Coil ID | Product SKU | Inventory | Sell By | Nutrition Code | Promo Code | Icon Code | Introduction Date |
| 23 | A1 | 9900-31 | 18 | 4/1/14 | F5 | - | 66 | |
| 24 | A2 | 3345-AA | 3 | 4/1/14 | G9 | - | 67 | |
| 25 | C2 | 4450-00 | 1 | 10/1/22 | H01 | 667-UY | 98 | 2/15/13 |
| 26 | | | | | | | | |

METHOD AND SYSTEM OF PERSONAL VENDING

This application is a Continuation of application Ser. No. 13/857,129, filed Apr. 4, 2013, for which this application claims benefit and priority. Application Ser. No. 13/857,129 specification, original claims, drawings and abstract are included herein by reference.

BACKGROUND OF THE INVENTION

Payment and product selection from vending machine now typically follows the following sequence:
- (a) The customer inserts cash or swipes a payment card using a reader on the vending machine;
- (b) The customer makes a single product selection by selecting the numeric or alphanumeric identifier for the location of the visible product in the vending machine;
- (c) The vending machine vends the selected product and provides change, if required, based on a stored product price for the selection made.

Although this sequence was original a consequence of the mechanical design of early vending machines, this is still the sequence used on machines with modern, electronic controllers.

Vending machines with drinks that are not visible, typically soft drinks in cans, often have a small number (e.g., six) of buttons for drink selection. Those buttons typically have the name of the product, and often, a brand or other visual product identifier on, next to, or visible through the button.

This system suffers from a number of product sale weaknesses that do not affect the majority of non-vending point-of-sale purchases. For example, making multiple product purchases at the same time requires repeating the full sequence of steps from the start for each desired product. As a second example, the price is constant for all customers, with no possibility of sales, coupons, promotions, or loyalty programs. As a third example, there is no practical method to provide additional information about a product, except as what can be seen from the front of the vending machine. As a fourth example, there is no customer service possible, such as product recommendations based on current or prior product preferences of the customer. As a fifth example, for most machines, the customer is selecting a desired product via a crude identifier, such as C7, rather than the name of the product, which is what the customer knows. As a sixth example, the user interface for different vending machines is not consistent. As the customer uses different vending machines the customer has to examine and figure out the exact requirements of each particular machine, such as the location of the desired product, how the identification codes are entered, and the price.

This invention overcomes all of these weaknesses of the current vending technology, which is the prior art.

Some vending machines now have a LCD panel, which may also be a touch panel. This more sophisticated interface provides some benefits, such as the customer being able to select products by name or icon. However, there are major drawbacks to this approach. First, the panels are expensive. Second, it is difficult to retrofit the vending machines. Third, the panels present a much higher risk of vandalism or failure. Fourth, the use of the panels does not enable customer-centric knowledge, such as product preferences, or loyalty programs.

Vending machines present unique sales and customer services challenges considerably distinct from physical stores, catalog purchase, and internet purchases.

Prior art includes user interfaces for non-vended products, such as provided by Amazon.com or Netflix.com.

SUMMARY OF THE INVENTION

The features discussed below exist in various embodiments of the invention, as one trained in the art will appreciate. These features are neither all required, nor is the list comprehensive. However, the aggregate of various features, as unusually synergistic and novel, provide benefits and results not expected from any previous implementation of individual features, as will be explained.

In brief, this invention allows a vending customer to use her own mobile electronic device as a second, virtual, or replacement "front panel" for one or more physical vending machines. The basic functions available to the customer include product selection, payment and vending—all without physically touching the vending machine. The invention includes novel means to identify the vending machine, including identification based on available local wireless networks, user location data such as GPS, and on-machine graphics.

Other features and benefits of embodiments of this invention include:
- a) fast and simple product selection by the customer;
- b) ability of the vending company to offer a customer product suggestions;
- c) ability of the customer to select multiple products at once;
- d) ability of the customer to purchase a product combination in a single transaction wherein components of the product combination are more than one vending machine;
- e) ability of the customer to pay via different modes;
- f) elimination of the need for the customer to carry cash or a physical payment card;
- g) storage and convenient presentation of the customer's preferred products;
- h) elimination of offering to a customer a product that is not in stock;
- i) elimination of offering to a customer a product that is past its "sell by" date;
- j) ability of the customer to request additional product information, such as ingredients or nutrition;
- k) ability of the vending company to provide additional product information to the customer;
- l) ability of the vending company to promote new products;
- m) ability of the vending company to participate in revenue generating promotions by product manufacturers;
- n) knowledge to the vending company about product combination purchases;
- o) ability to charge different customers different prices;
- p) ability to have product sales;
- q) ability to use coupons and other promotions;
- r) ability for the customer to provide feedback to the vending company;
- s) a standard interface for the customer while still using a variety of vending machines;
- t) ability of the customer to request directions to a nearby vending machine that stocks a requested product;
- u) ability of the vending company to direct the customer to the nearest qualified vending machine;

v) ability of the vending company to place machines in a less public or less visible location, yet still maintain sufficient sales from that machine;

w) ability of the management at the machine location to participate in vending machine and product management;

x) ability of the vending company to receive feedback directly from customers at the time of the sale;

y) ability to implement loyalty programs, including variations on loyalty programs such as third party loyalty programs or points that may be used in third party programs;

z) ability of customer to request that a vending machine stock a desired product;

aa) ability of customer to initiate, manage or orchestrate a program to convince a vending company to stock a vending machine with a desired product;

bb) ability of a group of affiliated customers to vote on product preferences;

cc) ability of the vending company to offer sufficient motivation to a non-customer to become a customer;

dd) ability of the product manufacture to interact with or communicate directly with the end customer;

ee) ability of the vending company to sell advertising or promotions, including advertising or promotions to customer from the product manufacturers;

ff) ability of the customer to track health-related information based on the customer's vending product purchases;

gg) ability of the customer to "bank" money by overpaying, or refusing change, where the banked money may be used towards future purchases;

hh) ability of one machine to provide change for the customer to use to use to make a purchase on another machine;

ii) ability for one customer to make a purchase on behalf of another customer;

jj) ability to provide more complex product options, such as vending condiments or napkins;

kk) ability of the customer to receive coins or bills from a vending machine;

ll) ability of the customer to show off her personal electronics;

mm) ability of the customer to participate in voting for new vended products;

nn) ability of the customer to purchase products as gifts for other customers;

oo) ability of the customer to make a purchase in advance of being adjacent to a vending machine;

pp) ability to queue up more than one pending product sale on one vending machine and then dispense the correct product to the correct customer;

qq) improved sanitation;

rr) less waste;

ss) additional automation becomes possible of complex product, condiment and accessory combinations;

tt) the ability of the customer to participate in games and wagering; and uu) the ability of the vending company to offer games and wagering.

An end-customer first identifies himself or herself (from now one, with no intent to restrict or insult gender, herself) to the vending company. Such identification includes some means for the vending company to reach the customer, such as an email address, SMS identification, or other electronic address or social network identification. Optional information may include gender, age, name, location, product preferences, and the like. For each end-customer ("customer") there is a list of associated vending machines ("machines"). These are the machines from which the customer does or might purchase products ("use" or "patronize").

The customer has a personal electronic device with graphical user interface (GUI) and communication ability. Such a device might be a smart phone, a tablet, a PDA, a laptop, display in an automobile, or other device. The device need not be portable, or handheld, although those are preferred embodiments. Communication may be via a wireless connection, such as Bluetooth®, Wi-Fi™ (IEEE 802.11), a 3G or 4G data cellular connection, near-field communication (NFC), a wired connection to the internet, or other wireless communication means, including future communication means as such technology changes rapidly.

Other user interfaces include audio, which may be one-way or two-way. Some user interfaces include touch input and haptic output. For example, a list of products may be displayed on a scrollable screen, or read audibly to a customer. The customer may select from the displayed list with a touch, and select from the read list with a voice selection.

In one embodiment the invention includes an application ("app"), software that runs on the user device. In another embodiment the application runs on a server under the control of the vending company. The user may use a browser or an app to access the cloud-based application. The application manages the features in a convenient and highly integrated way to provide benefits and results unexpected by the combination of individual features, as will be explained.

Then, when a customer experiences a problem with a machine or product, or the customer has a request for a product, the customer communicates this information or request via the app.

Although there is typically a list of machines already associated with the customer, it is frequently desirable for the customer to be able to indicate a specific machine. This invention provides several means to do this quickly and conveniently. In one embodiment, the app provides a set of graphical images for the machines associated with the customer. These images might be photographs, drawings, or icons of the machines, including, if necessary, some textual or contextual information about the location of the machine, such that the customer may quickly see from the displayed images the desired machine (for example, a drink machine versus a snack machine). The customer selects the desired machine with a touch, click, voice or other user-input action.

In a simple example, a customer walks near a machine. The app, knowing the location of the customer, the machine and its current inventory, the customer's preferences and purchasing history, including products and typical purchase times, buzzes the phone in the customer's pocket. The customer removes the phone and sees a display of both the machine and a selection of her favorite products. "Dispense Sugar-Os," she says to her phone. Under control of the app, the vending machine dispenses a package of Sugar-O's with no further actions by the customer. The application manages or communicates payment, participation in a loyalty program, customer health information, and vending inventory.

In an alternative simple scenario, the customer simply touches a single icon representing a "Magic Almonds" consumer packaged good (CPG) and a bottle of spring water on her phone, and the vending machine next to her immediately dispenses the Magic almonds product while the vending machine next to the first machine simultaneously dispenses a bottle of water, where the specific brand of the bottle of water was selected by the vending company.

In another embodiment the machine has an identification graphic visible on the machine. Such a graphic might be an image of person, animal, cartoon character, mascot, logo, or meme, as examples. The graphic might have additional identification, such as the use of adjective, verb, location, or number. As a simple example, a cartoon face of a happy boy called, "Freddie," might be used. Variations might include, "Weekend Freddie," "Nerd Freddie," "Florida Freddie," or "Freddie 24." The customer either selects a matching icon, presented by the app, or enters the information, for example, on a keyboard, or via voice.

In another embodiment, the customer takes a picture of the machine, using the camera in her cell phone or other device, which is then communicated from the phone or device. The app, vending company, or third party then identifies the machine based on the photograph.

In another embodiment, a machine identifiable symbol, such as a bar code or QR code, is read by the camera in a customer's cell phone or other device. The app then reads the symbol, which in turn identifies the machine.

In another embodiment, the vending company creates a map or table associating a machine with a location. The location may be identified by GPS coordinates or by a signature based on local area networks or cellular network cells within range of the machine. In this embodiment, the app could determine the location by providing GPS coordinates or the network(s) signature based on such information provided by the customer device. The lookup operation from the location to the machine could be performed either in the app, by the vending machine company, or by a third party.

In yet another embodiment, each machine associated with a customer is dynamically queried. The machine then queries, using a local communication network, to determine which machine is closest to the customer at that moment.

Once a unique machine (or a physical group of machines where each machine in the group stocks products unique to that group) is identified, the customer may initiate a transaction related to that machine. One such transaction might be to report a problem with the machine or with a product. Another such transaction might be to report that a product is sold out of the machine. Another such transaction might be to request a different product in the machine. Another such transaction might be to take advantage of an incentive or promotion, such as a coupon, sale or discount, points, contest entry, ability to vote, games or other products, services or features. Another such transaction might be to accumulate points or value in a loyalty program.

In yet another embodiment, the vending company may communicate to the customer. The vending company may provide acknowledgement of a transaction by the customer. The vending company may provide an incentive, benefit or inducement to the customer to purchase a product or engage in other behavior desirable to the vending company. There are many such incentives, including those mentioned above. The vending company may provide useful information to the customer, such as the arrival of new product, the repair of a machine, the results of voting, status of a loyalty program, nutrition data, or other information.

In yet another embodiment, the app provides the customer a user interface for the machine. For example, product selection may be via the app, rather than by pressing a button on the machine. One advantage to this feature is the ability to have standard user interface across a range of machines. Another advantage is to provide to the customer additional information or incentives on the same screen or related screen as used for product selection. Another advantage is the ability to order a product in advance. Another advantage is the ability to order multiple products at once, including products from different machines. For example, a customer might order a snack food from one machine and a drink from an adjacent machine with a single touch on a touch screen. As another example, a customer might be able to order a product and take advantage of an offered discount with a single touch on a touch screen. In another advantage a customer might is able to see nutrition information formation displayed along with product choices. In another advantage a customer is able to see translations of products or product information in another language. Another advantage is that the customer does not have to touch the vending machine control, providing improved sanitation to both the current and future customers.

In yet another embodiment, the app provides the user with an alternative method to pay for the product. Such an alternative method may be more convenient for the customer, such as not having to carry change, or may provide other benefits, such as record keeping, discounts, points, or other incentives.

What these features have in common, and a unique benefit of the combined features it that, in combination, they provide an unusually convenient and comprehensive interface for the customer with respect to multiple vending machines. This invention, for the first time, permits an effective relationship to form between the customer of machine-vended products and the company that provides or services vending machines.

The app, running on the personal, mobile electronic device of the customer, provides a comprehensive, consistent sales interface and front panel for all vending machines. And, the app provides most of the "customer service" functions normally provided by an informed and capable store employee in a store, the "store" is now all vending machines available to the customer.

Unexpected results of this invention include increased customer satisfaction, more effective machine utilization, more rapid new product introduction, and increased machine sales.

One example of increased profit to the vending company is the ability to put products that are about to expire on sale. The customer benefits by receiving discounted products and the company benefits by selling products that otherwise would have to be discarded at a loss. Prior to this invention the vending company would not have the ability to sell products that otherwise would expire and be unsalable.

Averaging sales across a large number of vending machines provides an aggregate picture (quantity and dollars) of which products are the most popular. However, in practice, the sales from one individual machine often differ substantially from these industry averages. Prior to this invention, the vending company had no practical way to determine which products would sell in a machine that does not currently carry one of those products. This invention provides, for the first time, a way for the vending machine company to determine an improved product mix (sometimes called "merchandising") for a machine.

A typical vending location provides more than one vending machine. Typically, there are some customers who use the machine(s) regularly, some customers who use the machines occasionally, and some potential customers who never use the machine. Vending companies would like to have the customers who currently use the machine(s) to encourage those customers, such as fellow employees or students, who rarely or never use the machine(s), to do so. Prior to this invention, the vending company had no practical way to do this. This invention provides, for the first time, effective mechanisms for some customers to directly encourage other customers to use the vending machine(s) more, or to start using the vending machine(s).

One such embodiment allows people within a potential customer range of vending machine(s) to vote on their favorite existing or new product for the machine. One or more of the voters are rewarded when a certain number of votes for a product are received. If one customer wanted to have a new product placed in the machine, say, "Magic Almonds," that customer could encourage her friends and associates to vote for Magic Almonds. When the necessary number of votes is received, that customer is rewarded. One such reward might be the promise to place the Magic Almonds product into the machine. Another such reward might be a coupon or discount. Another such reward might be points or value on a loyalty program. Many other types of rewards are possible.

Instead of votes, a current customer may be offered an incentive to cause an additional customer to register, use the app, or otherwise become identified under embodiments of this invention to the vending company. A reward might be any of those mentioned above, or a different reward.

Yet another embodiment of the invention is the ability of the vending company to make recommendations or offer incentives for the customer to use a vending machine that this particular customer has not used before. The machine may be new. Or, the customer may not have been aware of the machine location. Or, the customer may be in a new location and thus not generally aware of any convenient machines. Because the app has several ways to identify the location of the mobile user device, and the vending company or the app has maps that associated locations with machines, this embodiment provides the novel and unexpected benefit of informing customers of additional machines within the customer range. The app may be aware of the customer's product preferences, including time-of-purchase preferences, and thus may limit recommendations of machines to those machines that currently have in stock one or products that the customer prefers, or products that are in a group preferred by the customer, or to limit recommendations to a likely purchase time. Because the app is aware of the customer preferences for purchasing products at a particular time of day or on a particular day of the week, this knowledge may be used to make recommendations or to prioritize recommendations. Prior to this invention, no practical method existed for vending companies to dynamically inform a customer of useful machine locations based on both the customer's location and stored maps or tables associating locations with machines.

In yet another embodiment, games and wagering may be used as either an engagement mechanism for customers, a method to provide product information to customers, or as a reward for desired behavior. In addition, games or wagering may be used as an advertising vehicle for the product manufacturers.

In yet another embodiment, a loyalty program is integrated with the app. Loyalty programs have numerous formats. In one format, the customer is rewarded based on aggregate purchase dollar volume or unit volume. In another format, the customer is rewarded for trying new products. In another format, the customer is rewarded for increasing the purchases or creating other desired behavior of another customer, or for finding a new customer. In another format, the customer is rewarded for participating in an event or activity, such as playing a game, wagering, entering a contest, or reading product information. In another format, rewards are benefits provided by a third party, such as points in a loyalty program, money or other value in a virtual game, or discounts on non-vended products.

In one embodiment the location of customers or the location of machines may be determined by examining the network signature created by available (within range) Wi-Fi™ networks. A vending machine is normally in a fixed location. The availability of various Wi-Fi™ networks at or close to the machine provides a reasonably fixed and reasonably consistent method of location identification. "Reasonable," in this context, means sufficient for the invention to perform as intended. One method of creating a Wi-Fi™ network signature is to look at available (receivable) broadcast SSIDs. An ancillary method is to also look at the signal strength of receivable networks. Another method is to look at the available BSSIDs.

There are at least three methods of creating or examining Wi-Fi™ signatures. A first method is to use the customer's electronic device. In one embodiment the app includes this ability or accesses other apps or APIs that provide this ability. Because the app is in communication with the vending company, the vending company may then build, enhance, verify, or use a map or table entry incorporating the Wi-Fi™ signature at the customer's device.

A second method is for the vending service technician or driver to have his own portable electronic device with the ability to build a Wi-Fi™ signature. This device stores the signature, then provides the signature to the vending company, either through wireless communication, later communication, or by transfer via a storage device, such as a memory card. This second method has the advantage of possible additional control and data entry by the technician, driver, or vending company.

A third method is for the vending machine, or a device attached to the vending machine, to build a Wi-Fi™ signature. The vending machine may then communicate this signature to the vending company via a communication means in the vending machine, such as through a machine audit device, or may transfer the map to a service technician or driver.

Similar to the Wi-Fi™ signatures described above, one embodiment of the invention uses a cellular site signature. The nature of cellular site signatures is well known in the art. Similar to cellular site signature is the use of cellular geolocation.

In yet another way to identify a particular vending machine is by the customer's product choice. Consider the case where two vending machines are side by side. One may dispense cold drinks while the other dispenses packaged snack foods. If the customer selects a snack food from the menu displayed in her personal mobile electronic device, then the specific vending machine, of the two adjacent machines, is now identifiable. If the customer selects both a drink and a snack form her menu, then both machines are identified and the app can sum the prices and provide instructions for both vending machines to properly dispense the proper products.

Note the particular benefits in this example. The customer makes a "single purchase" involving multiple products from multiple machines. This is convenient for the customer. The vending company benefits by higher total sales. The customer may take advantage of a promotion that discounts the two products purchased together over the sum of the two a la carte prices.

There is another unexpected benefit. Vending companies may enhance the purchase of products by offering associated products and items, such as condiments, dips, re-use bags, insulated cold drink holders, or napkins. We refer to all of these, both edible and non-edible, as accessory products. Such accessory products could be dispensed by the same vending machine or a separate vending machine. Such accessory products could be offered for additional price, or as an additional free benefit for a purchase, and/or could be selected specifically by each customer. The particular benefit improves the value of the product for the vending company, thus increasing sales, as well as providing customization of the purchase by the customer, increasing the value of the purchase to the customer.

Such offering are not practical now because of the complexities of trying to link two machines, the need to charge as a completely separate transaction the purchase of the accessory product, and the complexity and time required by the customer to make such accessory product selections.

There is yet another unexpected benefit. Currently, complex products such as hot-dogs and espresso-based coffee drinks are rarely dispensed from vending machines. The limitation today is not so much the challenge of building an automated machine to dispense these products, but rather the complexity of a customer specifying such products. This invention provides a customized, updatable user interface that allows a customer to select a complex product she regularly purchases with the single touch on a display, as one embodiment. Or, a series of simple menus may be presented to the customer, logically organizing the customer's choices. For example, one such complex product might be a Kielbasa on a whole-wheat bun with spicy mustard and sauerkraut. Another example of a complex product might be a coffee product consisting of a two-shot, non-fat latte made with soymilk.

There is yet another unexpected benefit. The invention may be used a bank for coins and small bills. For example, money in excess of the purchase price could be deposited in a machine or charged to a payment method. The invention would remember and store the excess money, which could then be used towards future product purchases. This feature is particularly advantageous when considering coins. The vending machines could be used as both a repository and dispensing means for coins. It is not necessary to make a product purchase to use this banking function, although the vending company may require a product purchase or charge a variable service fee based on product purchases. For example, in many cities it is necessary to use coins to feed parking meters. If a person parking does not have the necessary coins, that person is often seriously inconvenienced. With this invention, that person could be directed to the nearest suitable vending machine which would then dispense the necessary coins, while debiting from the customer's vending account balance the value of the dispensed coins and possible transaction fee.

Similarly, some people do not like carrying excess coins. These coins, which might have been given to the person as a result of a purchase in a store or restaurant, could now be deposited into a vending machine, with suitable credit then applied to the customer's vending account.

This facility is similar to current ATM machines. However, ATM machines do not accept of dispense either coins or small bills. Vending machines are already equipped to receive and dispense coins, and in many cases, small bills. Thus, both vending companies and customers would now have a chance to take advantage of a large existing installed base of mechanical facilities and an existing distributed physical inventory of coins and currency.

The vending company may decide to charge for these "ATM-like" features. However, the vending company may decide that the charge is waived for customers who make a purchase. In this way, the vending company is encouraging additional sales with almost no additional infrastructure or labor cost.

The invention, in one embodiment, has sufficient data and the ability to provide customers with variably priced or variably available ATM-like services. For example, if a machine is, at the moment, low on quarters, that machine will not appear as an option to dispense quarters to the customer on the customer's display via the app. A vendor may encourage or discourage the deposits of cash or the dispensing of cash by means of variable fees. In this way, a vending company can manage the amount of cash in a machine and the amount of cash that must be removed from machines, transported, controlled and counted. The transport, counting, security and management of coins and small bills are a significant cost to vending companies. Thus, the ability to provide some assistance in this area to the vending company, as well as providing for a new source of revenue, is a novel and unexpected benefit of this invention.

In yet another embodiment, a location manager may be able to participate in the management of vending machines within or near to his facility. In an exemplary scenario, a small company may have two vending machines, one for drinks and one for snacks. The employees of the company are unhappy with product selections. The interface point between the employees and the vending company may be the company's HR manager, who has little motivation to deal with vending machine issues, and has little power over the vending company. With this invention, the HR manager may be easily given an electronic interface to the vending company allowing him to recommend or insist on product selection changes or pricing changes. The use of an electronic information flow from the customers' personal electronic mobile devices to and from the vending company makes it relatively simple to place the HR manager within this information flow.

The ability to integrate other customer information with vending purchases is a unique, novel and unexpected ability of this invention. For example, a customer may wish to track calorie intake. The app, which has the information for each purchase, may easily look up in a database the calories for each product purchased and add these to the total calories consumed by the customer. The calorie interface and app may well be a separate app than the vending machine interface app. similar functions could apply to other health related, or non-healthy related aspects of purchased vending products.

In one example, suppose a customer both wishes to exercise more and eat snack food. This app, or another app, could monitor the exercise activity of the customer. There exists many ways to do this, from using the accelerometer in the personal mobile electronic device to count stairs to an electronic interface to a piece of equipment in a gym. The app could be set up so that the customer must climb at least six flights of stairs before the purchase of a snack is permitted. Note that a customer might decide to circumvent this restriction by purchasing "anonymously" from a vending machine using cash, in the conventional way. However, if the customer has her personal electronic mobile device on her person during the purchase, and the app is able to uniquely identify the machine, the app may be able to determine that the customer did, in fact, make such a "forbidden" purchase.

In the prior art, there is a vending machine controller inside each vending machine, which may be thought of as the "brains" of the machine. The controller receives input from components of the vending machine, such as the coin box, and the product selector buttons. It provides output to components of the vending machine, such as turning a dispensing screw or telling a coin mechanism to return coins as change.

The software that runs the prior art vending machine controller may be in a physical device such as an EPROM or a memory stick. It may be updated by replacing that hardware device or by downloading new software via an interface.

In one embodiment of this invention, the "brains" of the vending machine are replaced by a software application, running either on a customer's personal mobile electronic device or on a remote server, or on a combination of these two programmable units. The current controller in the vending machine is replaced or supplemented with a remote connection capability. We call this the in-vending replacement controller. This in-vending replacement controller serves the functions of: (a) forwarding machine inputs through a communications link; and (b) receiving discreet commands from the communication link, which are carried out by activating the associated device within the machine. The in-vending replacement controller does the minimum amount of processing to accomplish these two functions, plus core housekeeping and machine safety functions. For example, the in-vending replacement controller no longer knows about prices for each product facing. Nor does it necessarily know at what step the customer is in a purchasing sequence.

In another embodiment of this invention the current controller in each vending machine is enhanced. We refer to the enhanced controller as an in-vending enhanced controller. The key function added to an existing controller is a "vend" command. If a customer has paid for or is about to pay for a product via an app on a personal mobile electronic device, the only function required from the physical vending machine is the "vend" function.

In one embodiment, this invention comprises a new element inside the vending machine, which may be implemented in software or firmware. This element is identified as a "vend command capability." It is implemented via an enhancement or replacement of the current vending machine's controller, with the new controller referred to as an "in-vending enhanced controller" or an "in-vending replacement controller" respectively.

The benefits provided by this invention solve a long felt need with no prior solution in the vending industry.

BRIEF DESCRIPTION OF THE DRAWINGS

FIG. 4 shows exemplary database tables.

DETAILED DESCRIPTION

For a vending machine to accept and respond to a "dispense" electronic message, the machine may need to be modified from its default configuration. One such modification is to replace the firmware in the controller of the vending machine to support such a dispense function. A second method is to replace the controller in the vending machine with a controller that supports such a dispense function. A third method is to provide an intermediate "dispensing controller" in the electrical path between the existing selection buttons on the machine and the existing controller; and also in the path between the coin, bill or card reader for payment and the existing controller. In this embodiment, the dispensing controller simulates the desired product selection by emulating the necessary selection buttons and also by emulating the necessary payment, in the appropriate order (which is often, payment first).

In a situation where a customer has selected a product for purchase, or actually purchased a product in advance, meaning not standing directly in front of and close to a vending machine so as to exclude other customers from the simultaneous use of the machine, it is typically necessary to establish a correspondence between the machine and the customer just prior to dispensing the product. Such a "dispensing correspondence" may be done primarily by the customer, primarily by the vending machine, or in combination. For example, the customer may use her UI or capabilities in her personal electronic device to identify a particular vending machine. Such identification may be sufficient to request the machine to dispense immediately, or, such identification may be in advance and the customer will then provide a "dispense" request, such a touching a button, or via a voice command, when she is ready to accept the dispensed product. Or, the vending machine may recognize the customer and recognize that the customer is at suitable distance for product dispensing. Actual dispense commands to the vending machine (v. a user request) may come from a remote server, from the app, or from a combination of both.

DESCRIPTION OF DRAWINGS

Figure 1:
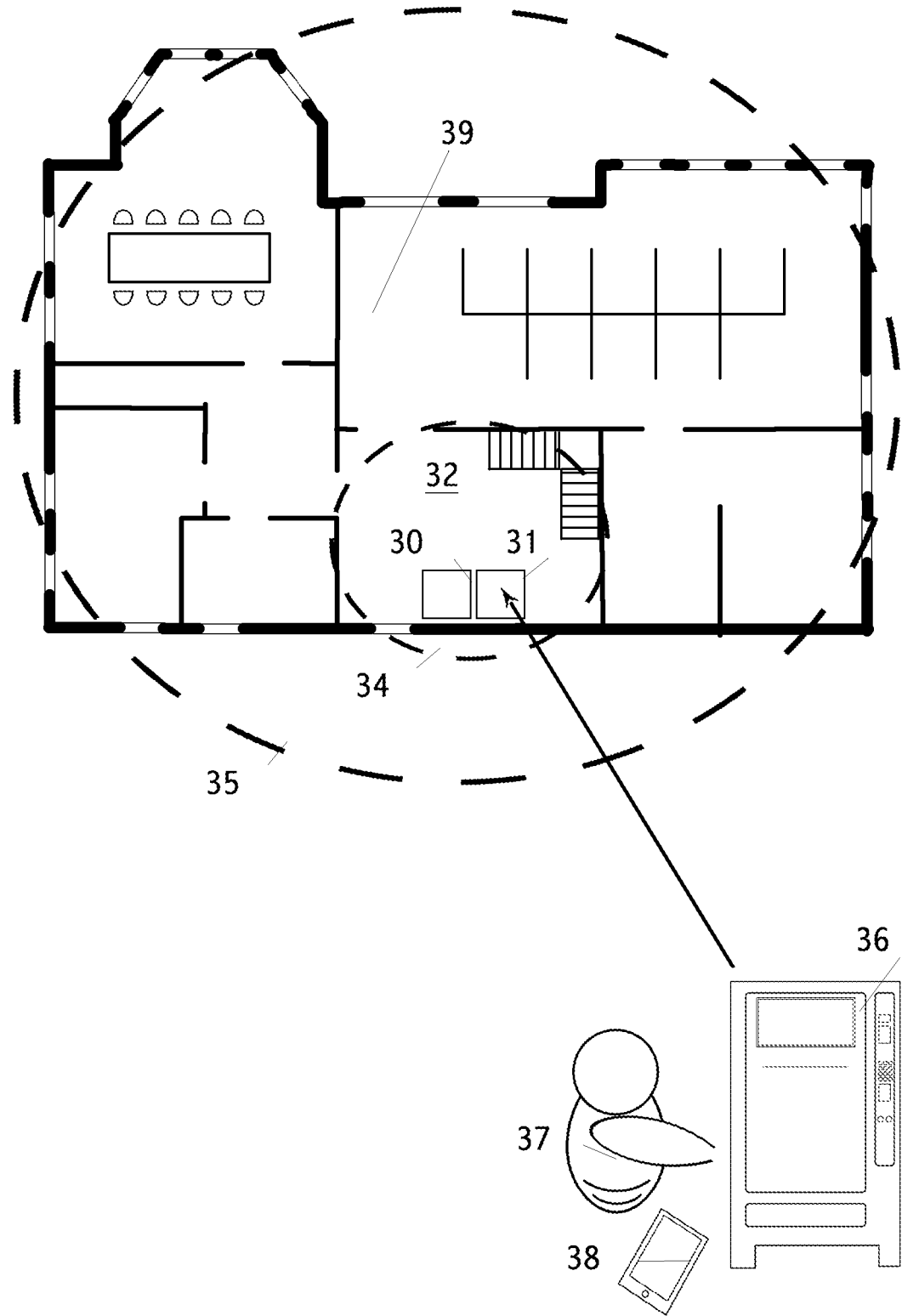
FIG. 1 shows an exemplary configuration of two vending machines on the floor of a private company, with two transaction distances.

Turning now to FIG. 1, we see an exemplary configuration of two vending machines, 30 and 31 on one floor, 39, of a private company. The two vending machines 30 and 31 are located in a lobby area, 32. When describing transactions of embodiments of this invention, it is helpful to define four transaction distances from a vending machine such as 30 or 31, or a group of vending machines, 30 and 31.

Transaction distance depends on the one or more transaction types, and the progress of a transaction. A first such distance is "dispensing distance," which is a customer in front of a vending machine within one step of touching the machine. This distance is not shown in FIG. 1. A second such distance is "identification distance," which means that either the customer is able to recognize a particular machine or the machine is able to recognize a particular customer, or both. This distance is not shown in FIG. 1, and is dependent on the specific identification technology being used. In general, it is greater than the dispensing distance and less than the "within sight" distance. As discussed elsewhere, numerous embodiments and technologies are available for such identification. A third such distance is "within sight" of one or more vending machines, which means being able to directly see at least one machine. In FIG. 1, this is the lobby area, 32, and is shown by the dashed perimeter line, 34. A fourth such distance is "potential buyer," which means that the person is within a predetermined range of one or more vending machines. The "potential buyer" range is also called a "customer range." Such a distance may be on the same floor, such as the floor in FIG. 1, 39; or in the same facility, such as a company, transit terminal, or school; or within a direct distance, such as 100 feet, 200 feet, 500 feet, or 1000 feet; or within a walking distance, such as 100 feet, 200 feet, 500 feet, or 1000 feet; or within a transit time, such as 30 seconds, 1 minute, 2 minutes, 3 minutes, 5 minutes, 10 minutes, or 15 minutes; or with a radio communications distance, such as the radio range of Bluetooth®, a Wi-Fi® network, or other local area wireless communications protocol. In FIG. 1, the dashed perimeter line, 35, shows this "potential buyer" distance.

A customer and vending machine "co-located" or "co-location" means within a transaction distance.

FIG. 1 also shows a front view of vending machine 31 in illustration 36, and a customer, 37, with her personal electronic device, 38.

Identification and use of the above four described "transaction distances" is unique to traditional vending, and indeed, unique to traditional purchase transactions.

Figure 2:
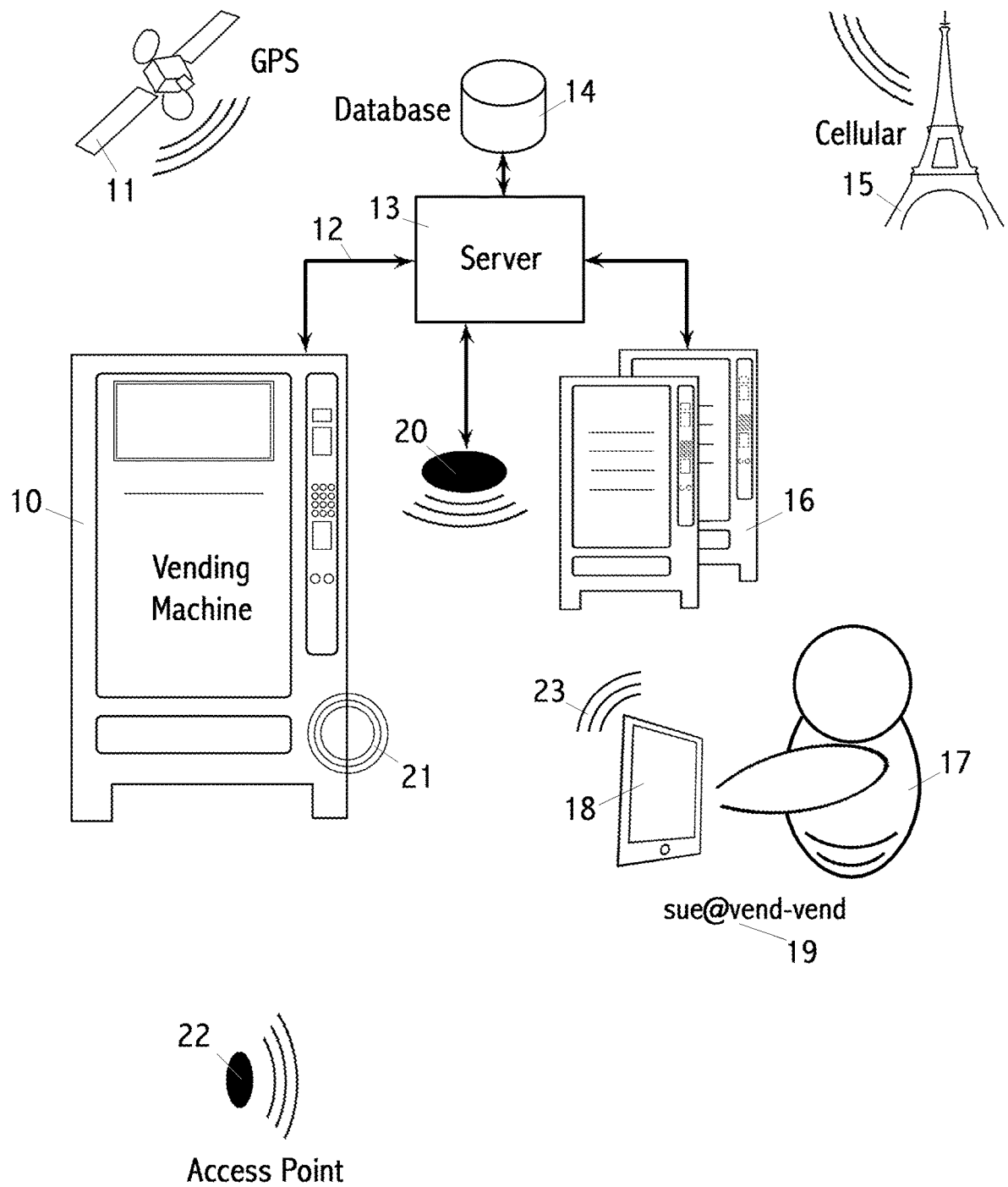
FIG. 2 shows exemplary configurations and elements for communication of embodiments.

FIG. 2 shows exemplary embodiments and technologies used for various elements of transactions of this invention. 10 is an exemplary vending machine. This particular vending machine has an NFC transponder, shown as 21, and a communication link 12 to a server. The communication link 12 may be wired or wireless. The server 13 is connected to a database 14 and to a wireless access point, 20. The server database 14 holds sales data and computerized inventory for a plurality of vending machines, shown as 10 and group 16. All server communication and sever communication links may be wired or wireless, using public or private networks, using Internet Protocol (IP) or other protocols. There may be substantial intermediate nodes and technologies in these communication links.

Determining customer 17 location may use one or more technologies, including GPS 11, cellular geolocation 15, LAN identification from access points such as 22 and 20, inertial guidance, vision based location determination, RFID, badge reading (not shown in FIG. 2), NFC 21, manual location entry by the customer, 17, and other technologies. Inertial guidance may use an accelerometer and other sensors in the customer 17's personal electronic device 18. Vision based location may use a camera in the customer 17's personal electronic device 18. Manual location entry may a user interface in the customer 17's personal electronic device 18. FIG. 2 shows wireless communication 22 with the personal electronic device 18. FIG. 2 also shows the customer 17's identification, for some transactions, as 19. Note, as discussed elsewhere herein, the customer's identification may vary based on the transaction type or transaction step. Note that access point 22 is not connected to the server 13, but is used, nonetheless, in some embodiments, to determine or help determined customer 17 location.

Figure 3:
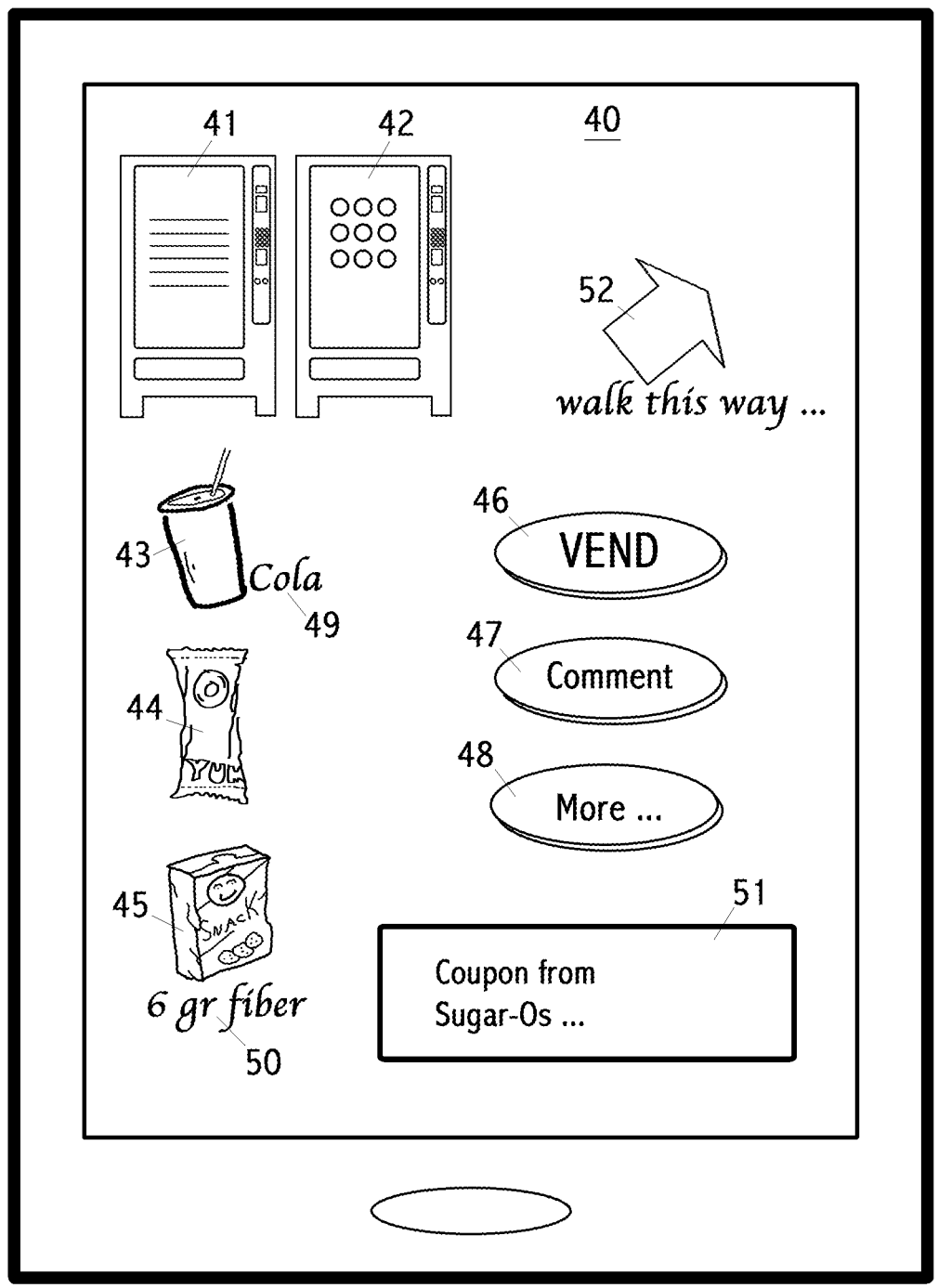
FIG. 3 shows an exemplary transaction screen on a personal electronic device.

FIG. 3 shows an exemplary screen on a personal electronic device, 40. The screen shows two different vending machines, 41 and 42. In one embodiment, the icons or photographs, 41 and 42 are representative of two actual machines co-located with a customer and owner of the personal electronic device, whose screen is shown, 40. In one embodiment, for a transaction step, the customer selects which machine she wishes to use by touching icon 41 or 42. An optional arrow, 52, helps direct the customer to a vending machine. Such an arrow is particularly helpful if the customer has no prior purchase history from a particular vending machine or group of machines. The instructions under the arrow, 52, may provide additional information, such as "take the escalator to the lobby," or "vending machines located in the lunch room." The customer may be offered products in the vending machines via icons or text, or both, shown as 43, 44 and 45. These products may be prior purchases by the customer, or products previously identified by the customer as favorites, or products recommended by the vending company. The group of products 43, 44, and 45 may have user interface features such as scrolling, to show additional products. Products may be described by text, such as a "cola," shown by text 49. Products may be specific, such as the "Yums" shown as 44, or generic, such as the cola drink, 43. Additional information about the product may be displayed, such as "6 gr fiber," shown as 50. Additional, optional, communication from the vending company to the customer is shown in the box 51. Here, a coupon for a product is offered. Many other promotions and awards are possible, as discussed elsewhere, herein. The customer is offered transaction options, including purchasing and dispensing the product, which may be a single touch, such as the "VEND" button, 46. The customer may leave feedback, by touching the "Comment" button, 47. Such feedback options are discussed elsewhere, herein. More customer options are available via the "More . . . " button, 48. Some such options are discussed elsewhere, herein.

Optional user interface items include holding a finger on a product icon, causing a popup text box with more product information; double-tapping a product icon to bring up a more detailed information screen, and additional customer options, such selecting the product as a favorite; swiping from a product icon to off-screen to remove a product from the displayed list; and scrolling the product list with a smooth finger motion vertically on the screen to see additional product offerings. A search field may be provided (not shown in FIG. 3) for customer to enter or speak a product name, product class, or product attribute, such as "healthy snacks." For the exemplary screen shown, only two touches are required to vend a product: the product selection (43, 44 or 45) and the "VEND" button, 46. Alternatively, if the smart phone in this exemplary embodiment is voice enabled, the customer may say, "dispense Yums," or "vend a cola" as the only action necessary to cause the a vending machine to dispense the spoken product, when the customer is within dispensing range of the machine. In one embodiment, the customer may select a product combination in a single step, such as by saying, "vend a cola and the fiber snack," or by selecting an icon that shows two or more products in combination (not shown in FIG. 3). Note that machine 41 dispenses snacks, and machine 42 dispenses drinks. As these are the only two machines offered in this screen, it is not necessary to select a machine if a product is selected. In one embodiment if the customer selects a particular machine, such as 42, the product display changes to show only products available from that vending machine, such as beverages. The list of products shown, here 43, 44 and 45, may be sorted based on a sort criteria, such as (i) products most often purchased in the past by this customer; (ii) products that are most often purchased from this vending machine; (iii) products being promoted for some reason by the vending company; or (iv) another sort criteria.

FIG. 4 shows an exemplary sample of some database tables. This Figure is arranged in rows labeled 10 through 26, and columns labeled A through H. For convenience, we use relational database terminology herein, although the database is not necessarily relational. A database may comprise more than one database, and typically but not necessarily comprises more than one table. When we refer to "a database" we may be referring to a portion of a database relevant to that context. A customer table is shown in rows 10 through 12. Three fields are shown in A10, B10 and C10, as Customer ID, Customer Name, and Customer Address. Row 11 shows one exemplary record, where and additional record might be in row 12, as this table is expanded. The Customer ID in A11 is the database reference for the customer, here "4567." The Customer Name in B11 is a name provided by the customer, here, "Suzie." The Customer Address is some electronic address to reach the customer or her electronic device. This address might be an IP address, MAC address, email address, phone number, SMS ID, social network identification, or other effective address. The address may or may not be a globally unique identifier (GUID). The address may be permanent or temporary. The Customer Address field in this record is shown as 13.778.441 (which is not an IP address). Typically, a customer records would have fields in addition to the three shown here.

FIG. 4 also shows a product purchase history table for this customer, in rows 13 through 18. The fields, in columns A through H include in order: Product SKU, Product Name, Purchase Date, Purchase Time, Total Purchases, How Paid, Machine ID, and Other Information. The Product SKU is used by the vending company to track products uniquely. Often a single product name will have multiple SKUs, due to minor differences. The Product Name is a name that customers typically associate with the product. The Purchase Date and Purchase Time are self-evident. Total purchases tracks the total number of times, within some calendar period, such as 0.5, 1, 2, 3, 4, 6 or 12 months, the identified product was purchased by this customer. The use of this field permits consolidation of table entries. How Paid indicate the payment used for this transaction. The Machine ID is the unique identification of the vending machine used by the vending company. If the record is a summary of more than one transaction, the Purchase Date, How Paid, and Machine ID indicate the most recent purchase. The Purchase Time may be an average time for a set, possibly all, of purchases of this product. Other Information may include optional comments, notes, exceptions, or additional data. In one embodiment, information in this field is encoded using XML. This table shows four exemplary records, in rows 14 through 17. Additional records may start in row 18, as the table expands. Typically, the product purchase history table would have fields in addition to those shown here.

FIG. 4 also shows a vending machine table in rows 19 through 21. The fields, in columns A through E and H, include in order: Machine ID, Machine Location, Machine Route, Machine Address, Icon Code, and Other Information. The Machine ID is the unique identification of the vending machine used by the vending company. The Machine Location comprises the street address of the vending machine, and may also include more detail such as "lobby." The Machine Route is the route or subroute for servicing this vending machine, using the unique route code used by the vending company. The Machine Address is some electronic address to electronically communicate with the vending machine. (The Machine Address shown in row 20 is not an IP address.) The Icon Code identifies the visual icon or photograph used to identify this vending machine on the display of the personal electronic device. Other Information may include optional comments, notes, exceptions, or additional data. In one embodiment, information in this field is encoded using XML. This table shows one exemplary record in row 20. Additional records may start in row 21, as the table expands. Typically, the vending machine table would have fields in addition to those shown here.

FIG. 4 also shows a Coil ID table in rows 22 through 26. The fields, in columns A through H, are in order: Coil ID, Product SKU, Inventory, Sell By, Nutrition Code, Promo Code, Icon Code, and Introduction Date. Coil ID is the coil identification, or "facing" in the vending machine that holds the product to dispense. The Product SKU is used by the vending company to track products uniquely. The Inventory field tracks the number of physical items of that product SKU in that coil location at the present time. The Sell By field is the last date when the next product in a facing to be dispensed may be sold. This is sometimes called an expiration date. The Nutrition Code is an optional field that may be used to provide additional nutrition information to a customer in some embodiments of this invention. It may also be used for merchandizing purposes, such as to arrange products in the machine or to meet certain contractual requirements. Typically, the Nutrition Code is in index into a nutrition table with more information (not shown). The Promo Code is an optional field that may be used to provide a customer with promotions regarding this product, in some embodiments. The Icon Code identifies an icon or photograph that may be presented to the customer on her user interface screen that represents this product. The Introduction Date field may be used to determine if the product is "new," for the purpose of promotion, for example. Three exemplary records are shown in rows 23 through 25. Additional records start in row 26, as the table expands.

Customer ID, Product SKU, and Machine ID are typically index fields for tables in the database. As one trained in the art appreciates, there are many alternative ways to store and retrieve data for this invention. Embodiments discussed herein are for the purpose of providing disclosure and enablement, not to show means or to provide limitations.

Figure 5:
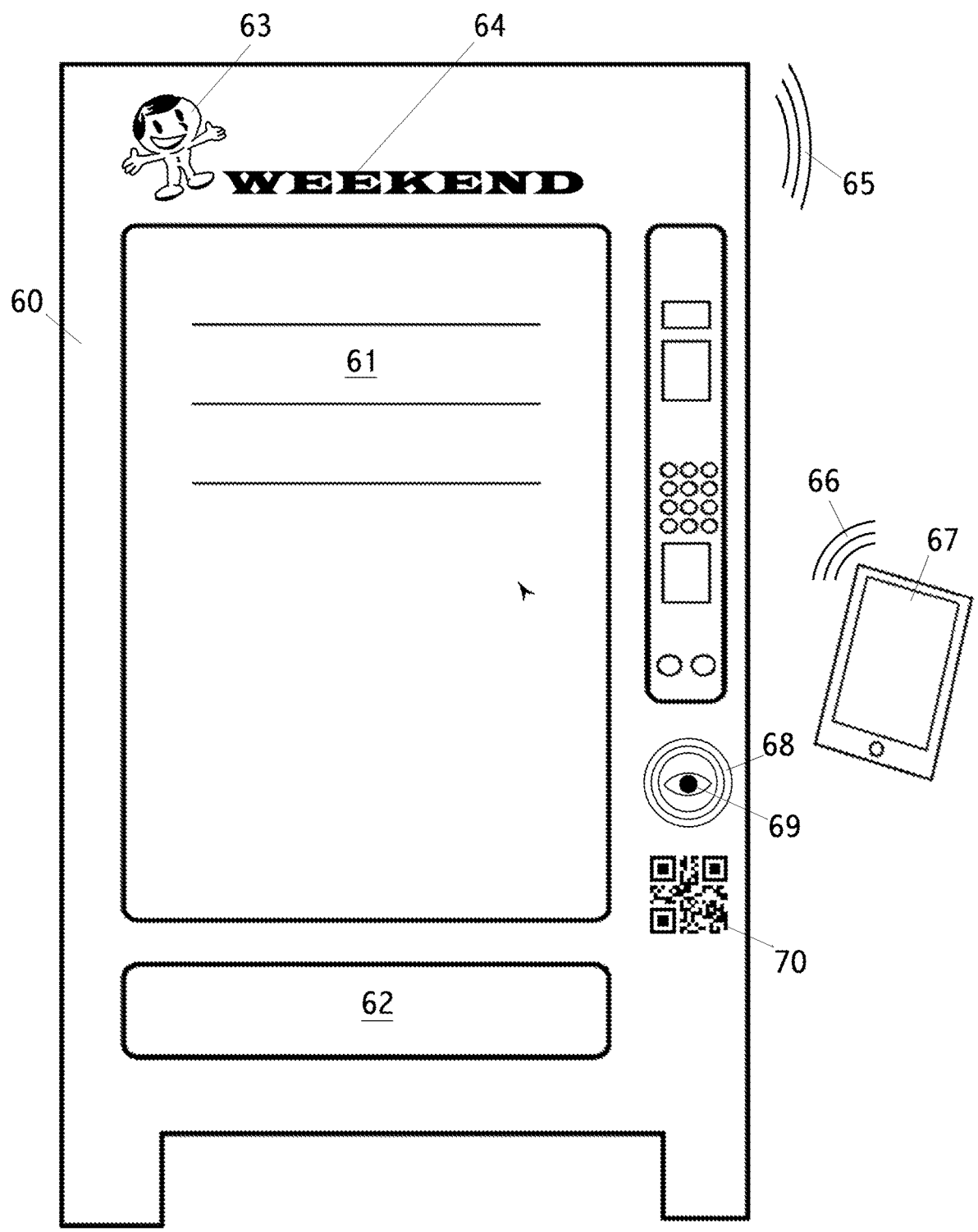
FIG. 5 shows various vending machine identification elements of different embodiments.

FIG. 5 shows several exemplary embodiments of identification and location determination. In various embodiments, for various transactions, and for various steps of transactions it is necessary for a customer to identify a particular vending machine; for the vending machine to identify a particular customer; and for a determination to me made if a customer is within a particular transaction distanced with a vending machine. The elements in FIG. 5 are: the vending machine, 60; the visible products or "facings" in the vending machine, 61; the product dispensing area or tray, 62; an icon used to assist in the identification of the vending machine, 63; a textual modifier to the icon, 64; wireless communication by the vending machine, 65; wireless communication by a personal electronic device, 66; the personal electronic device, 67; an NFC communications port, 68; a camera, 69; a printed bar or matrix code, 70.

In one embodiment, a customer may identify a vending machine, at least in part, by identifying the icon, 63, on the vending machine. Such an identification may be on the customer's personal electronic device touchscreen, by selecting the icon from a set of icons, for example. The system of this invention, in this embodiment, may place a set of icons on the customer's screen, where each icon corresponds to each machine within a transaction distance of the customer. For example, if there are, say, two groups of vending machines, one group of two and one group of three, on the same floor as the customer, the system may offer a set of five icons from which the customer chooses a particular vending machine. Note that often the precise location (say, within one foot) of the customer and a similarly precise location of the vending machine are not known. For example, the best known location for a machine may be only a street address. The best known location for a customer may be a GPS determined location, or the "last known" GPS location for a customer who is no longer able to receive GPS signals. Thus, in this scenario, it is typically necessary for some additional methods to be used to determined either (a) which machine is closest to a customer, or (b) which machine a customer is referencing for a transaction. In another scenario, a customer is standing 20 feet away from a group of seven vending machines. Even if the precise location of the customer were known (say, within one foot), and the similarly precise location of each of the seven vending machines is known, it is not known which vending machine the customer wishes to select for a transaction without some additional input from or activity by the customer.

The combination of an icon plus a textual modifier provides a suitably large number of variations to identify one vending machine from a plausible group of vending machines. Consider, for example, eight different icons and ten different textual modifiers. There are then 80 possible combinations, which is sufficient to identify all possible vending machines within the accuracy of the known locations of the machines and the customer. Since a key purpose of this invention is to provide for improved communications between the vending company and the customer, and a second key purpose of this invention is to provide improved convenience to the customer, the use of a small set (say, 25 or less) of icons, and a small set (say, 100 or less) of textual modifiers, provides the customer with both familiar and highly-recognizable identifiers, while also creating a comfort level for the customer. The icons and the textual modifiers, or both, may correspond with certain emotions felt by the customer, such as looking forward to weekend, or the pleasure of taking a work break. Certain icons may also be associated with certain types of products sold in a vending machine.

FIG. 5 shows one exemplary icon, 63. This icons' name might be, "Freddie." Next to the Freddie icon is the work, "WEEKEND," 64. A customer might remember and identify this vending machine as, "Weekend Freddie." This name might be spoken by the customer to her personal electronic device to identify the machine, or might be spoken by her personal electronic device to confirm this particular vending machine for a transaction.

The wireless communication, 65, from the vending machine in FIG. 5 may be provided by hardware in the vending machine, on the vending machine, or nearby the vending machine, where nearby means within the communication range of the customer's personal electronic device, 67, for the technology of the wireless communication. The possible technologies for wireless communication by the vending machine, 65 and by the customer's device, 66, are discussed elsewhere, herein.

In one embodiment a camera on, in, or nearby the vending machine, 68, is used for identification. In one embodiment, an image captured by this camera, 68, of the customer's face (not shown in FIG. 5), in conjunction with face recognition software, is used to identify the customer. Since the camera, 68, is positioned in, on, or next to vending machine 60, this serves the three purposes of (i) identifying the customer; (ii) identifying the vending machine, 60, and (iii) determining the location of the customer. For example, the use of camera 68, may be used to determine if the customer is within dispensing distance. In an alternative embodiment, the customer may provide a unique and recognizable image to the camera, 68. For example, the display on the personal electronic device might be a matrix code, such as a QR code, which might be generated dynamically under the control of an app on the personal electronic device. The customer holds her personal electronic device up to the camera, 68, which reads and recognizes the displayed image, thus serving the three purposes listed above in this paragraph. Note that the image is not necessary a code; it may also be an image, such as the face of the customer, or another image.

An alternative use of a camera for identification is the use of a camera in the personal electronic device, 67. We refer to this as the "customer's camera." There are three potential aspects of the vending machine 60 that may be readily recognized from an image captured by the customer's camera. These are: (i) the overall vending machine, for example, the machine as shown in FIG. 5; (ii) the icon, 63; and (iii) a code, such as a QR code, 70. Alternatively, optical character recognition may be used if the customer captures an image of a vending machine number, name, or the textual modifier, 64. The use of either the icon 63 or a printed code, 70 are preferred, as these are well-defined visual targets for customers and recognition software for these is well known in the art. Determining distance from camera images is well known in the art.

In another embodiment, near field communications (NFC) is used for both identification and to determine that a customer is within dispensing distance. An NFC communication port is shown in FIG. 5, 68. The customer' personal electronic device may also have NFC capability, allowing the customer to place her personal electronic device at the NFC target, 68, to both confirm customer identification and to confirm a pending transaction, such as product purchase.

In another embodiment, wireless communication, shown in FIG. 5 as 65 and 66, may be used to not only determine identification of both the vending machine and the customer, but also to determine transaction distance, including a dispensing distance. For example, signal strength or signal direction, or both, may be used. It is well known in the art how to construct a radio antenna with a short or narrow usable radio distance.

In one embodiment, a method of selecting a product is as follows: first, the customer takes a picture of the product area, 61, of the vending machine, 60. Then, the picture appears, under the control of an app, on the personal electronic device, 67. Next, the customer touches, in the picture, the product she is selecting. Finally, this selection is transmitted from the personal electronic device, under control of the app, to the software of this invention.

Figure 6:
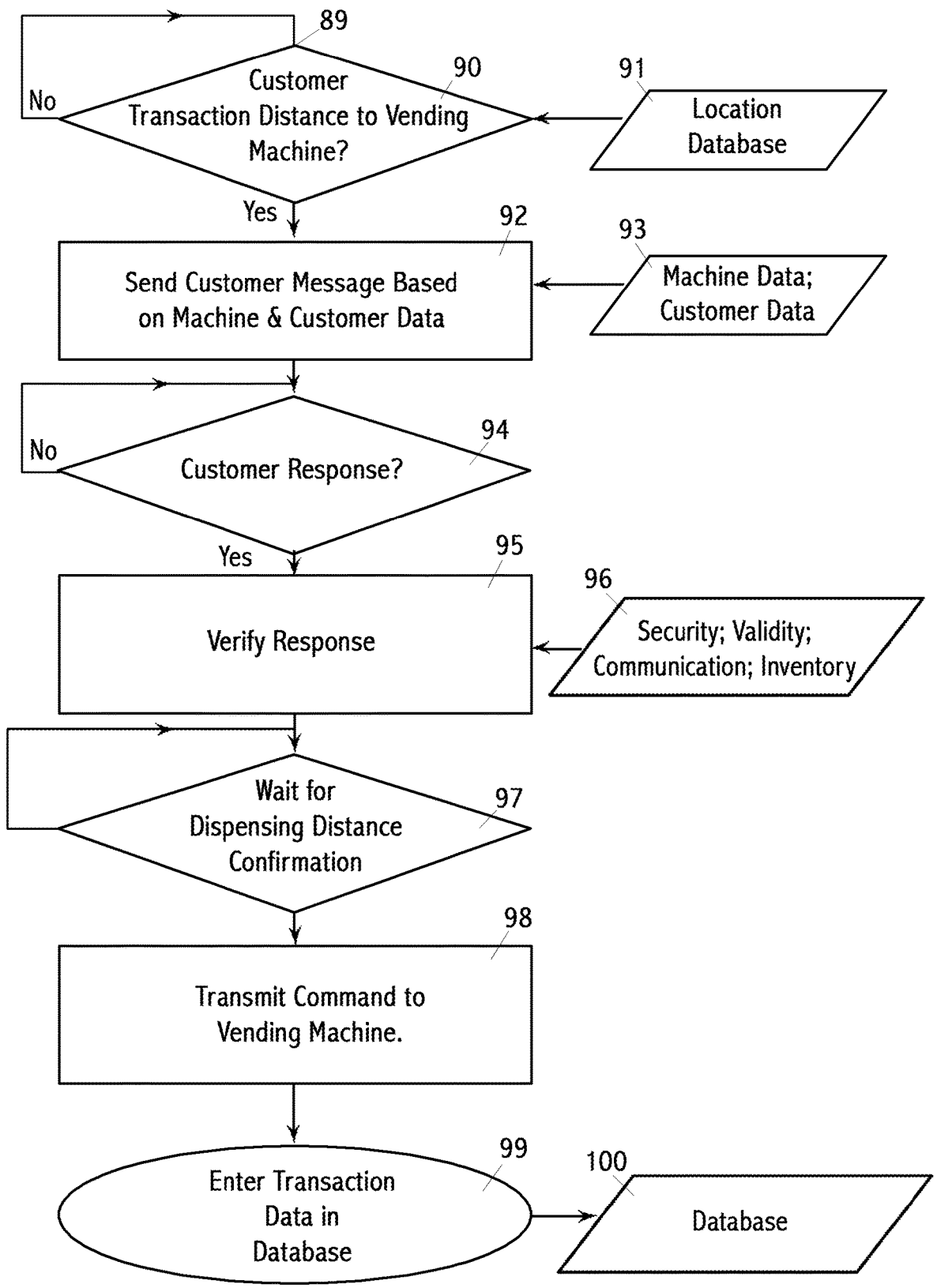
FIG. 6 shows an exemplary flowchart of one embodiment.

FIG. 6 provides an exemplary flowchart of steps for a customer to purchase a product in one embodiment of this invention. The flowchart starts at 89. In determination and waiting step 90, it is determined whether or not a customer is within a particular transaction distance of a particular vending machine or vending group. Transaction distances are discussed elsewhere, herein. A vending machine location database, 91, is used as part of this determination. When the customer within the transaction distance, in step 92 a message appropriate to the potential transaction is sent to the customer. This message is responsive to both the inventory in the vending machine(s) and the customer. Aspects unique to a customer may include the customer's prior vending purchase history or previously entered customer product preferences. A database holding both the vending machine(s) inventory and the information about the customer is shown, 93. In step 94 the embodiment waits for a customer response. If no response is received within a timeout period (not shown), the flowchart restarts at 89. When a timely response has been received, step 95 verifies the validity of the response. There are many ways to verify validity, as those trained in the art know. For example, the message may be encrypted; contain a password; contain a communications checksum or hash; fall within predetermined bounds such as time, location, product type or price;

use a secure element within a personal electronic device; use a third party to determine validity or any combination of these or other means. A database with information related to validity determination is shown, 96. If the customer response fails verification, the flowchart reverts to step 90 or 92. If the customer response succeeds, in step 97 we wait for until dispensing distance is confirmed. Methods for determining dispensing distance are discussed elsewhere, herein. Note that the dispensing distance may already be confirmed by the time step 95 completes. Following step 97 a dispense command is sent to the vending machine, step 98. Finally, in step 99 we enter the transaction into a database, 100. In various embodiments, variations and additional steps may be performed, as one trained in the art appreciates. For example, in step 99, it may be appropriate to wait until the vending machine either confirms or reports that dispensing was successful. Note, however, that such waiting is not mandatory, and indeed, some vending machines may never make a timely report. Note also that payment for the transaction may occur at various points, as discussed elsewhere. Indeed, payment, in some embodiments, may not occur or may not be validated until after the transmission of the vend command in step 98.

An important aspect of some embodiments is knowledge of and use of the distance between the customer and a particular vending machine. This knowledge permits a customer to "pre-order" a product prior to standing directly in front of the particular vending machine. It also permits an embodiment to send a customer a message, or an offer, when the customer is within reasonable purchase distance, but not standing in front of the particular vending machine. It also permits one customer to order, or pay for, or both, for another customer. It also permits more than order to be queued for a particular vending machine, a novel benefit.

Figure 7:
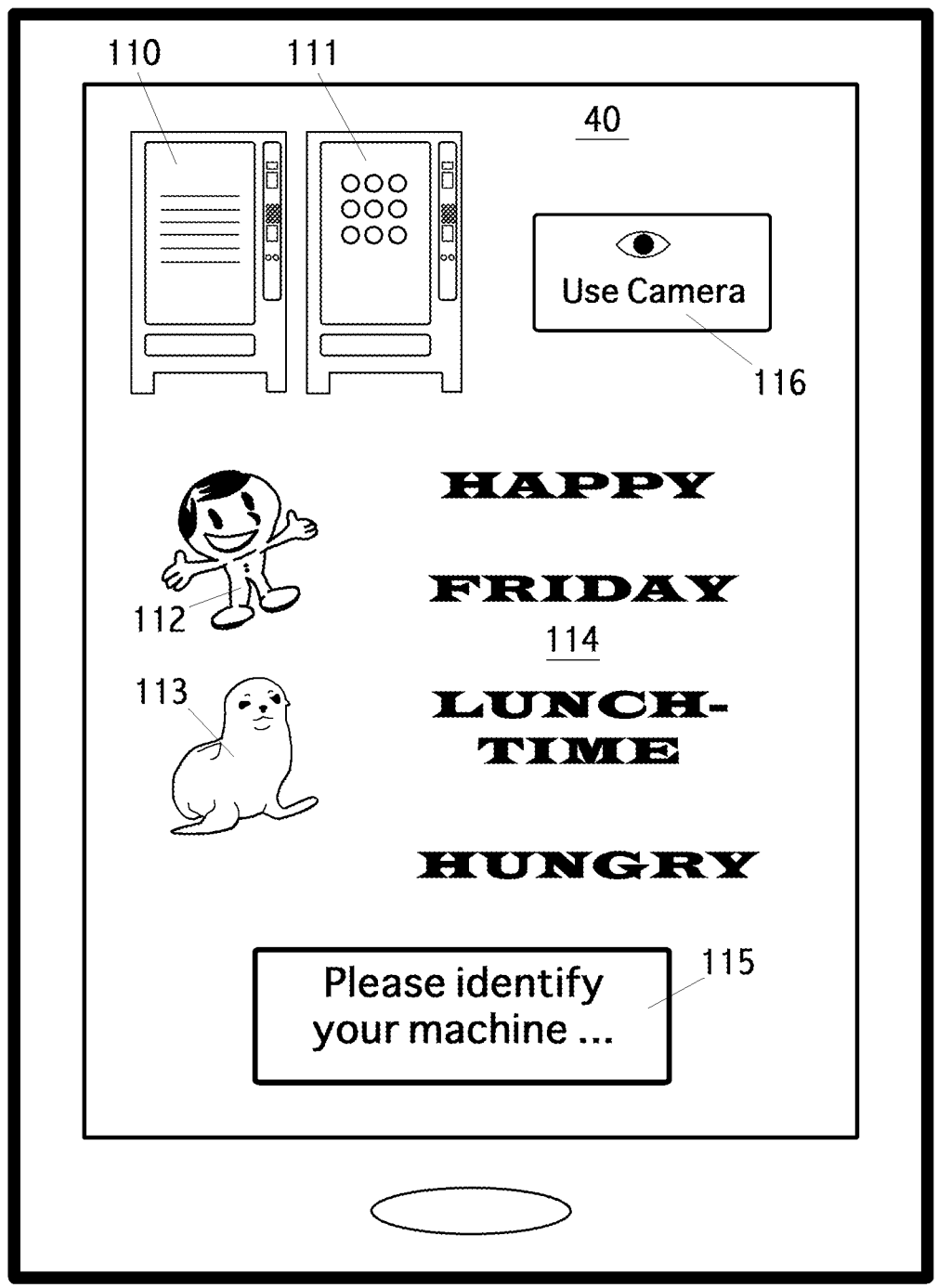
FIG. 7 shows an exemplary screenshot of one embodiment of vending machine selection by a customer.

FIG. 7 shows an exemplary screen on a personal electronic device in one embodiment. This screen is used by the customer to identify a particular vending machine. The visible screen is 40. Two different vending machine types are shown, 110 and 111. Machine type 110 vends consumer packaged goods (CPG), while machine 111 vends beverages. When a customer selects one of these two machine types, she limits the number of additional choices she has to make to identify a particular machine, including possibly no additional selection options. Two machine identification icons are shown as 112 and 113. These icons may be, "Freddie" and "Sally Seal," respectively. Also shown on the display, 40, are four textual modifiers, "HAPPY," "FRIDAY," LUNCH-TIME" and "HUNGRY." In this embodiment each vending machine within a transaction range of the customer has both an icon and textual modifier. Using the touchscreen on her personal electronic device, the customer selects the icon and textual modifier of the desired vending machine. This action clearly and easily identifies a specific machine. Consider, for example, a high-rise building with 36 floors, with three vending machines near the elevators on each floor. The vending machines may be identical models, stocking similar but not identical products. It is clearly necessary that the correct vending machine be reliably identified. Similarly, a college campus may have similar models of vending machines spread across the campus.

Additional embodiments shown in FIG. 7 include an option to use the camera in the personal electronic device, shown with a touch button 116. There is also a message area to the customer, with a displayed message in the box, 115.

In one scenario, the customer is located on floor 22 of building. Her personal electronic device is able to receive the BSSID and the SSID of three particular Wi-Fi™ networks. A vending machine location database in this embodiment determines from this Wi-Fi™ information that she must be on one of the floors 20 through 23. Thus, the only icon and textual modifiers presented to the customer, from which to choose, are for vending machines on these four floors. These are shown as 112, 113 and the list 114, in FIG. 7.

Additional Claim Comments

When we say that a programmable device, such as a server or personal electronic device, or software running on such a device, or a user interface on such a device, performs an action, such as but not limited to "accepting, "receiving," "presenting," "displaying," or "transmitting," we mean that the software is adapted to perform such an action.

A communication address is a unique identifier for a recipient such as a person, device or application that may be used to direct an electronic message to the recipient. Such an address may be an IP address, a MAC address, an email address, a phone number, an SMS destination, a unique name, street address, or physical location, as a few examples. It may also be a permanent or temporary number chosen randomly or under the control of algorithm from a range, including a self-assigned number. The communication address may need to pass through one or more levels of lookup in an index or dictionary, in order to resolve or reach the desired recipient.

Identification of a customer by a server comprises a communication address of the customer or sufficient information such that a communication address of the customer may be looked up, in either a local database or via a remote lookup service. As two examples, a customer may have a login name, or the customer's portable electronic device may have a globally unique identifier. As a third example, face recognition may be used to identify a customer. Note that such customer identification may not be globally unique, but may be only sufficiently unique for that particular transaction.

Note that in a special case, a customer may provide an identification, or one may be provided via a database or a third-party service, where this identification is sufficient to identify, in most cases, the customer from other customers near a particular vending machine or vending group. For example, a vending machine may show a message with the name, "Sue," indicating that a dispensing transaction is queued for Sue. Thus, Sue may approach the machine within dispensing distance so that the vending machine may dispense Sue's product. Customer identification may be a photograph of the customer's face, or a photograph provided by the customer, including an avatar.

"Software identification of one or more vending machines co-located with a customer," means using the vending machine location data in the database in conjunction with the location of the customer to determine within a predetermined likelihood that the customer is within a transaction distance of one or more vending machines. Such a predetermined likelihood may be greater than 50%, 75%, 90%, 95%, 98%, 99%, 99.9%, 99.99%, or 100%, for example. Co-located may be within walking distance, or within walking distance within a pre-determined time period, such 0.5, 1, 2, 3, 4, or 5 minutes. A co-located distance may depend on a location; for example, co-located distance on a college campus may be farther than a co-located distance in a business. A co-located distance may be within 50, 100, 150, 250, 500, 750, or 1000 feet, as measured walking, including elevator or escalator rides.

The "location" of a vending machine or customer means a location sufficient for the intent of the embodiment, element or step in discussion. A vending machine location may be a street address, or the name of a facility. It may be a geographic locations, such as latitude and longitude. It may be description such as "in the lobby." It may comprise metrics such as "500 feet past the main gate." It may comprise a floor number or use a labeling system within a facility, such as "next to room A105." It may comprise a position within a group, such as "third machine from left." It may comprise a visual identifier, such as a brand, or such as "the cola machine." As discussed elsewhere herein, different transactions required different levels of precision in the "location."

A user interface (UI) "presenting to a customer" means, for example, providing a set of visual icons, text, or other identification from which the customer may choose. The presentation may audible, such as spoken names, types or descriptions. Such a presentation may be sequential, such as first providing type or class, such as "drink or snack," then, when a customer has selected a first selection, of presenting to the customer additional choices within that first selection type or class. A presentation on a user interface may require scrolling or expansion of a not-displayed, but available, subset.

"Subset" means any quantity of the larger set that is in the range of one to the entire quantity of the larger set.

Products available, in inventory, offered, sold or dispensed, may comprise continuously or incrementally available products such as coffee, milk, mustard, spoons, napkins, bags, and the like. Such products may be a primary product such as coffee in the sale of coffee, or may be secondary, such as milk for the coffee, or mustard for a hotdog, or a bag for a purchase. Products also include consumer packaged goods (CPG) and drinks. Products also include non-food and non-beverage products, such as batteries or photographs. Products also include financial and access-control products, such as debit cards, membership cards, tickets, coins, and currency. Products may include services, such a boot cleaning, or access to space. This product list is non-limiting.

A "product" may be a group of related products. For example, a product offering to a customer her user interface may be a favorite snack combined with a favorite drink. If these two products are linked such that the customer may select the pair as a single selection, or the pair has a single price or single name, then this pair may be considered to be one "product," even if this product must be vended by two or more separate vending machines. The elements within this product may be identified as "sub-products," even if the sub-products may be purchased or vended separately. As another example, coffee with cream and sugar may be considered one product, independent of how the cream and sugar are dispensed. As another example, a hotdog with relish and mustard may be a single product.

Traditionally, each vending machine, was, in practice, a stand-alone entity. For example, a snack machine and a drink machine might be side-by-side. A customer may wish to purchase both a snack and a drink. However, the customer must execute two unrelated purchase transactions, one from each machine. Embodiments of this invention treat the two machines effectively as one, for some transactions, or portion of a transaction. For example, a customer may choose from the UI on her smart phone a selection comprising a combination drink and snack offering. Then, both machines dispense their portion of this selected combination. The customer might have been provided with a promotion that was good only for the combination. Similarly, a customer might select a hotdog from his UI. His preferred condiments are known the system, in the database. The hot dog dispensing machine may then automatically add his preferred condiments to the hotdog prior to dispensing. Or, the customer may be able to take his hotdog to one or more condiment dispensing machines and those machines then automatically dispense the correct condiments in the correct portions for the customer.

A customer may be able to select multiple items from a menu, on her user interface; then as the customer is within dispensing distance of one or more dispensing machines, the machine dispenses or more of the chosen menu items.

In one embodiment, product items, such as food, are prepared by hand, after the customer selection, and placed into an automated retrieval device such as individual pickup stations. When the customer is within dispensing distance of the pickup station, the door on the pickup station (for example) opens, allowing the customer to take the ordered item or items. In this embodiment, the automated dispensing stations are the vending machine.

Input from a customer may be in the form of a touch screen, typing text, or voice input. A customer may use short hand notation, such as touching an icon, or using an alias, abbreviation, or part of a product identification for the input. For example, a customer might say to her voice-enabled smart phone, "my regular sandwich," or touch an icon on a touch screen for a shown bowl of "soup of the day."

"Product preferences" may be expressed by a customer, or determined from other sources, and may be expressed in multiple ways. Such expression may be explicit by a customer, or selected from a list, or based on prior purchased, or may be, perhaps only initially, defaults. In one embodiment, product preferences of a customer may be determined by the statistical preferences of a group of similar customers, such as people with a similar purchase history or associates in a social network. Product preferences may be singular or plural. Product preferences may be brands, food content, nutrition value, temperature, size, packaging, condiments, spice, specific to single item or SKU, or general. Preferences might be related to time of day or day of week, or the weather, or other purchases. For example, one preference might be for "Magic Almonds" as a preferred mid-morning snack. Another preference might be for "spicy," for foods that have that as an option. Product preferences may be stored in a database under the control of the server, or on a personal computing device under the control of the customer, or in the cloud under the control of the customer.

A "quantity previously purchased" may be recorded and summarized in multiple embodiments. In one embodiment, each individual purchase by the customer is tracked, from some starting date. In one embodiment, purchases of the same product are totaled. In one embodiment, purchases within a product category are totaled. In one embodiment, recent purchases, within a predetermined time window, may be tracked individually, with purchase prior to this time window totaled or summarized. If product purchases are totaled or summarized, some information may be lost, such as which other products were purchased at the same time, or what time of day the purchases were made. Some of this information may be summarized or aggregated. For example, an "average" time of day for group of purchases may be tracked. Suitable time windows are one day, seven days, 30 days, 60 days, 3 months, or one year. A quantity previously purchased may be stored in a database under the control of the server or on a personal computing device under the control of the customer, or in the cloud under the control of the customer.

A dispensing message is any electronic message that causes a vending machine recipient of that message to dispense the requested product.

"Nearing their stale date," means that a product is within a predetermined time of its "sell by" date. Such a predetermined time may be variable based on the quantity of inventory of that product in the vending machine; or may be variable based on the historical sales rate of that product in that machine; or may be based on a likelihood of selling all of the product of that SKU by the "sell by" date; or any combination of these determinants. As a simple example, the predetermined time may be within 15 days or 30 days of the "sell by" date. A "sell by" date, or a "stale date" is also called an "expiration date." Such a date may mean that date, or the day before, or the day after.

"New items" in a vending machine are products in the inventory of the machine that were first placed in that machine within a predetermined time period; or whose sales since the product since it was first placed in the machine are less than a predetermined amount; or a combination. As a simple example, a new product may be any product introduced in that vending machine within the past six months. Suitable time periods for determining a "new item" are: 7 days, 14 days, one month, two months, three months, six months, and one year.

In some embodiments a second set of products to purchase are provide to a customer, where this second set comprises products that are related to the first set of offered products, in a product presentation. One such relationship is that at least one of the products in the second set was purchased within a predetermined time (before or after) of at least one product in the first set. Such a predetermined time may be 30 seconds, 1 minute, 2 minutes 3 minutes, 5 minutes, 10 minutes, 15 minutes, 30 minutes, 60 minutes, 120 minutes, or the same day. In a minimal case, there may only be one product in the first set, the second or both sets. Products from the two sets may be offered as combinations, including, for example, a combined icon or a combined price, including, for example, a benefit for purchased two products at the same time as compared to two separate purchased. A second such relationship is a previously provided product pairing preference by the customer. A third such relationship is historical purchase combinations by other customers. A fourth such relationship is a selection of product pairs by the vending company or by one or more product manufacturers. For example, by using discount, this may be one method for a manufacturer to promote a new product, by tying it to purchases of an existing product.

The above embodiment, may, in some embodiments be expanded to include more than two products.

An icon, or a "non-textual icon" might be a cartoon character or a face of a person or animal or plant, as non-limiting examples. Note that the icon may be primitive, such as a line drawing or single-color shapes, or may be complex, such as a photograph or 3D icon. An icon may be a registered brand mark or an icon associated with a brand.

An "textual modifier" of an icon may be a written adjective, such as "happy" or "speedy," or may be a noun used as an adjective, such as "weekend," "lover," "student," or "Friday," a verb, such as "running," or other text.

An icon at a vending machine may be on the machine, on a sign attached to the machine, or located close to the machine such that the association of the icon to the machine is clear. The icon may be printed, projected, or displayed electronically.

The "state" of a vending machine, as far as a customer is concerned, generally involves aspects of the machine such as: (i) out of stock of a product; (ii) product is unsatisfactory, such as stale, broken, or the wrong temperature; (iii) incorrect product; (iv) price is incorrect; (v) change was not properly returned; (vi) machine is malfunctioning; (vii) machine is damaged; or viii) machine is not clean. When a customer wishes to report such a state, it is advantageous to provide the customer with a predetermined list of options, such as the above list. Icons may be used in place of text, or icons plus text. Customer messages to the vending company are often other than a complaint or reporting the state of the machine. For example, a message may comprise new product requests, or a question.

One embodiment uses "voting" or alternatively product requests from multiple customer or potential customers of a vending machine. Should customer, "Sue," for example, want a particular favorite product to be stocked in a local vending machine, she may be able to convince fellow employees or fellow students to send messages to the vending company requesting her favorite product. If the vending company receives enough such request for the same product, under a campaign originated or managed by Sue, the vending company may reward Sue. One such reward is to place the product in the local vending machine. Another such reward is discounts on product purchases. Another such reward is "gift discounts" that Sue can distribute to her friends, but cannot use herself.

A location or vending machine "frequented" by a customer means a location or machine that the customer visits or patronizes at least at a predetermined frequency, such as a place of employment of the customer; or a place where the customer goes to school; or a place, such as a transit facility, that the customer uses regularly, such as at least twice a week; or a location otherwise visited by the customer. Such a frequency for a location or vending machine may be a minimum number of times per week, such as 1, 2 or 3. Such a frequency may be a minimum number of times in the past 1, 2 or 3 months, such as 2, 3, 4, 5, 7 10, 15, or 20.

A "product request" or a "desired product" by a customer may be for a specific product, or a product that meets a particular requirement or set of requirements, or a class or type of product. Requirements may be related to category, brand, ingredients, nutrition, ranking, packaging, price, convenience of the dispensing vending machine, nickname, other parameters, or an exact product identification.

An "available vending machine" to a customer is a vending machine that may be accessed by the customer. For example, a vending machine may be close to the customer, but the vending machine is located in a private business, and the customer is an employee or guest of the private business. Such as machine is not available. As another example, a machine may be in the process of being serviced, or be out of service. Such a vending machine is not available. If a customer requests the location of a near-by vending machine that has a particular product in inventory, the system has data in its database on the current inventory of all vending machines managed by the vending company. Thus, the system of this invention, in this embodiment, is able to generate an accurate and timely message to the requesting customer as to the location of near-by vending machines that have the requested product in current inventory. The embodiment and the vending machine locator message sent by the server in response to the customer request may provide a choice of multiple machines, in case one is more convenient, or preferred, over other choices. Navigation instructions may be provided.

A "dispensing ready" message may be sent by either the customer's electronic device, or by one or more vending machines, or both. It may be sent by a third piece of electronic equipment, such as a camera adapted for this purpose able to view both the customer and a selected vending machine. In some embodiments, a "dispending ready" message must be received from two sources.

A key feature of vending machines is convenience. The most convenient way to pay is "automatically," meaning without any additional explicit action by the customer immediately before, during or after a purchase transaction from a vending machine. A customer may approve in advance one or more payment methods for an embodiment. Payments may be charged to a "billing entity," such as a credit card, debit card, loyalty card, gift card, or any account associated with one of these; a bank account, or any other financial account or entity. One example is google wallet. Another example is e-gold. A customer may choose to require either approval or selection of a billing entity, or both, at all or a subset of transactions.

Traditionally, vending machines have required payment prior to product selection. This is the opposite order compared with nearly all other purchase transactions (that it, other than vending machine transactions). It is therefor a novel embodiment to permit or allow product selection first, then payment.

In a traditional electronic purchase transaction, a customer first identifies a payment method, which may be a default payment method; then approves the transaction, such may be by selecting a "buy," "purchase," or "confirm" button; then the seller approves the payment; then the transaction is finalized. Note that the step of the seller approving the payment takes time. For maximum convenience and speed, a customer would prefer that as soon as they have approved the purchase or the payment of the purchase that the transaction completes. Therefore, in a novel embodiment, dispensing a desired product occurs immediately after the customer purchase or payment step, before the seller (the vending company or server under their control) approves of the payment. In essence, the vending company is "trusting" this customer, who has already been electronically identified to the vending company, to have sufficient credit or funds in the selected or default payment entity to provide payment to the vending company for this transaction.

Additional Definitions

App or Application—software that provides a specified function. Applications are written in a wide variety of languages, including java, html, java script, flash, C, and many others. An application may run on a wide variety of "platforms," including operating systems and browsers. Apps, platforms, and the devices they run on may be "open" or "closed." As one trained in the art appreciates, the ecosystem of programmable devices, methods and tools is diverse and undergoes rapid innovation.

Communication address—an electronic address that may be use to communicate with an individual, such as an email address, a phone number, identification on a social network, or other means to both send and receive messages.

Computerized inventory—is the inventory of products in a vending machine or machines stored in a database. In a perfect world, this matches the physical inventory in the machine(s), minus any pending updates.

Customer identification or communication address—Identification data sufficient to uniquely identify the customer for a particular transaction. This identification may be globally unique, but often is not. It may be unique within a particular database. It may not be particularly unique. For example, if "Sue" makes a purchase near a vending machine, and identifies herself as, "Sue," the vending machine may display the name, "Sue," in order to identify a queued product dispensing transaction. The name is likely sufficient, in most cases, to differentiate from one or two other customer who are ordering from the same machine at the same time. Customer identification for one transaction, or one transaction type, may vary considerably from customer identification for another transaction or another transaction type, even for the same customer. Customer identification may be for the customer herself, such as her name, or may be for a machine in the possession of the customer, such as a phone number, email address, MAC address, or IP address. Customer identification or a communication address may be a unique identifier within a group of people, such as a social network. Communication to the customer may be via such a group or social network. Customer identification may be complex, such as an image of the customer's face.

Dispending distance—the dispensing distance between a vending machine and a customer is close enough so that the customer is clearly aware that the machine is dispensing a product for that particular customer. Typically, this means the customer is standing in front of the machine, within arms length, or within one step plus arm's length. This range may be from 0 to 3 feet, or from 0 to six feet. Such a distance may be determined with distance sensors, such as IR sensors, well known in the art, or by the use of RFID or NFC, or by the use a camera and an image recognition algorithm.

End-customer and customer—are used interchangeably. The end-customer is the person who purchases a product from a vending machine. Note that the contract regarding the vending machine is normally between the vending company and the location management. A customer may be a potential customer—not yet a paying customer.

End-customer and customer—are used interchangeably. The end-customer is the person who purchases a product from a vending machine. Note that the contract regarding the vending machine is normally between the vending company and the location management. A customer may be a potential customer—not yet a paying customer.

Identifying portion of a vending machine—In some embodiments, a vending machine may be uniquely identified in a form easily read and understood by a human, such as the use of name, phrase, number, icon, character or a combination of markings, such as "Friday Freddie." In some embodiments a vending machine may be uniquely identified in a form easily identified using software known in the art from a photograph, such the use of OCR legible text or a bar or matrix code, such as a QR code. When using a camera, such as on a smart phone, to identify a vending machine, the customer photographs such a portion of a vending machine, and then the app on the smart phone or similar device, either in the phone or in a remote computing device, analyzes the photograph and outputs a unique machine ID, such as the machine ID in a database. In some embodiments, the human readable form and the machine-readable form are the same markings.

Introduction Date—The date a new product is introduced. For a vending machine, this might be the date the product was first placed in a machine. More generally, it may be the date when both promotion and availability for the product became available in a region.

Location management or location manager—the organization or person who manages the location where the vending machine is located.

Personal electronic device—This is a smart phone, tablet, PDA, laptop, or similar electronic device that comprises a user interface (UI), a processor and memory capable of executing applications (apps), and wireless electronic communications. User interfaces may comprise any combination of display, video projection, touchscreen, keyboard, stylus, audio input, audio output, voice input, voice output, voice recognition, haptics, accelerometer, vision, vision recognition, motion recognition, face recognition, and the like.

Physical inventory—is the actual, physical inventory of products in a vending machine or machines at a point in time.

Sales data—for a vending machine comprises the individual transactions for a machine, including either an exact time or a time period for those transactions. Sales data for products may be separate from revenue data. For example, a vending machine may report sales by coil ID, while revenue is total revenue from a coin or bill box.

Sales value—the potential value to a vending company of a particular product in a particular machine. The sales value is estimated from the sales history of that product in that machine; the sales history of that product in other machines or industry wide; the stocking level of that product in that machine; the likelihood of that product in that machine going stale; and the profitability of each sale of that product in that machine. Sales value includes possible loss to the vending company, such as having to discard stale product. Sales value includes possible incentives for sale from the product manufacturer.

Scheduling—is a task done by the vending company where drivers or service technicians go out on a "route" to restock and otherwise service a set of vending machines on that route. Scheduling is often done daily. Scheduling is a key task in a computerized vending management system. Scheduling is much more accurate when driven by a vending management system that comprises computerized sales data for the vending machines managed by the vending company.

Server—any computer or computers in any location capable of performing the computer tasks necessary for that server function. A server must comprise a processor; non-transitory memory; one or more communications interfaces; access to a database; and be adapted to run a program. A server may comprise distributed hardware.

Subset—may be empty; may be the entire set; or may be a proper subset.

Vending company—A company generally in the business of managing and servicing vending machines. They may or may not own all of the vending machines they service and they may or may not service all of the vending machines they own.

Vending machine or machine—used interchangeably to mean vending machine.

Wireless communication—Methods of communication digital information without the use of wires, including but not limited to local area network (LAN) technology including all variations of IEEE 802.11, such as but not limited to a/b/g/n/p/; Wi-Fi™; Wi-Max™; Bluetooth®; VHS; UHS; 900 MHz bands; unregulated bands such as IMS, including 60 GHz bands; RF-ID, including both passive and active, in all bands, including LF, HF, UHG, European and North American UHF, microwave, 2450-5800 MHz, 3.1-10 GHz; all global cellular data bands and technology including 3G and 4G; near field communications (NFC); DASH7; Zig-Bee; police radio bands, transportation radio bands; marine radio bands, military radio bands; toll transponders; other RF technologies; barcode, matrix code, and character recognition input and output; optical technologies, including infrared (IR); LIDAR; and ultrasonic. Wireless data may be encrypted, or not. All possible modulation technologies and wireless physical layer standards are included, such as FCC, ISO/IEC and IEEE.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art will appreciate.

All examples are sample embodiments. In particular, the phrase "invention" should be interpreted under all conditions to mean, "an embodiment of this invention." Examples, scenarios, and drawings are non-limiting. The only limitations of this invention are in the claims.

We claim:

1. A system for vending products to a customer, comprising:
   a plurality of vending machines, managed by a vending machine company;
   a server, operating under the authority of the vending machine company, comprising a processor, non-transitory memory, a communications interface, and a database;
   wherein the database comprises a communication address of the customer;
   wherein the database comprises a current location of each of the plurality of vending machines;
   wherein the database comprises a current inventory of products in each of the plurality of vending machines;
   wherein the database comprises a customer order history for a plurality of orders;
   a personal electronic device comprising a processor, non-transitory memory, a communications interface, and a user interface (UI);
   software running in non-transitory memory on the personal electronic device wherein the software transmits to the server a user ID message comprising: (i) an identification of the customer, and (ii) a current location of the customer;
   software running in non-transitory memory on the server wherein the software creates a list of co-located vending machines wherein the list is responsive to the current customer location and each vending machine on the list of co-located vending machines is co-located with the customer;
   wherein the software running in non-transitory memory on the server sends a message to the personal electronic device responsive to the current product inventory in each vending machine in the list of co-located vending machines; and
   wherein the user ID message further comprises: (iii) a request message;
   wherein the request message is responsive to both a state of a co-located vending machine within vend range of the customer, and input via the UI from the customer.

2. The system of claim 1, wherein:

the request message further comprises a request for information desired by the customer.

3. The system of claim 1, wherein:

the request message comprises a request for service of the co-located vending machine.

4. A system for vending products to a customer, comprising:

a plurality of vending machines, managed by a vending machine company;

a server, operating under the authority of the vending machine company, comprising a processor, non-transitory memory, a communications interface, and a database;

wherein the database comprises a communication address of the customer;

wherein the database comprises a current location of each of the plurality of vending machines;

wherein the database comprises a current inventory of products in each of the plurality of vending machines;

wherein the database comprises a customer order history for a plurality of orders;

a personal electronic device comprising a processor, non-transitory memory, a communications interface, and a user interface (UI);

software running in non-transitory memory on the personal electronic device wherein the software transmits to the server a user ID message comprising: (i) an identification of the customer, and (ii) a current location of the customer;

software running in non-transitory memory on the server wherein the software creates a list of co-located vending machines wherein the list is responsive to the current customer location and each vending machine on the list of co-located vending machines is co-located with the customer;

wherein the software running in non-transitory memory on the server sends a message to the personal electronic device responsive to the current product inventory in each vending machine in the list of co-located vending machines; and wherein, in response to a user selection of a desired product via the UI, the personal electronic device displays directions to the nearest vending machine with the desired product in current inventory.

* * * * *